Patented Jan. 21, 1941

2,229,291

UNITED STATES PATENT OFFICE 2,229,291

MOLDING COMPOUNDS

Frank J. Groten and James H. Lower, Stamford, Conn., assignors to American Cyanamid Company, New York, N. Y., a corporation of Maine No Drawing. Application February 16, 1939, Serial No. 256,772

7 Claims. (Cl. 260—72)

This invention relates to a new class of molding compounds. The invention includes the molding compounds themselves, their methods of preparation, and molded products of improved properties obtained therefrom.

A large proportion of the molding compounds produced at the present time are of the straight phenolic type. The resins used in making them are usually prepared by the two-stage method, so called because of the addition of a substantial amount of a curing agent such as hexamethylene tetramine to the fusible resins in order to convert them to the infusible stage upon further heat treatment. The molding compounds prepared from these resins possess good molding properties and can be molded into products having satisfactory mechanical strength and water resistance. The electrical insulating properties of the molded products are also good with the exception of arc resistance, which is very poor in comparison with other known synthetic resin bonded materials.

Although the straight phenolic type molding compounds are well suited for a wide variety of uses, they possess a number of serious limitations. It is difficult to produce light colored and light-fast products, even when using relatively expensive synthetic phenol. When pure phenol is partially or wholly substituted by cresols or other cheaper grades of phenols, the resulting molded products have an inferior surface gloss and lower mechanical strength. Moreover, the curing time of the straight phenolic molding compounds increases progressively with an increase in the amount of cheaper phenols used in preparing them, and for this reason it is necessary to use substantial quantities of phenol even when color and finish are not of particular importance in the molded product.

Another serious disadvantage of the straight phenolic type molding compounds containing resins made by the two-stage process is the type of curing agent which they require. Hexamethylene tetramine is the agent most generally used to insure a commercially satisfactory cure, and this material is quite expensive. Moreover, its use imparts a strong yellow color to the resin and makes it unstable to light, so that the range of colored products obtainable is seriously limited.

We have developed a class of molding compounds which possess all of the most desirable properties of the straight phenolics, but which overcome the above noted and other disadvantages. The molding compounds of our invention are prepared from a new type of synthetic resin which is an aldehyde condensation product of the material obtained upon heating dicyandiamide with a phenol until substantial quantities of ammonia are given off and most of the dicyandiamide is converted into cyclic compounds. This is a different type of resin from straight phenol-aldehyde resins as well as from dicyandiamide-aldehyde resins, for it possesses properties not found in either. For convenience it will be called a heat-treated dicyandiamide-phenol resin, but it should be understood that this designation is in no sense a characterization of the resin as belonging to either of these classes. Its method of preparation is generally claimed in the copending application of William H. Hill, Ser. No. 225,564, filed August 18, 1938.

When a mixture of dicyandiamide and a phenol is heated, by refluxing or otherwise, ammonia is evolved and a phenolic material is produced which contains melamine, melam, melem and other aminotriazines. These will vary in quantity and proportions with the time and intensity of heating and with the amount of ammonia given off. Upon condensing the refluxed material containing these products with an aldehyde a heat-treated dicyandiamide-phenol resin is obtained.

We have found that this type of resin possesses a number of remarkable characteristics which render it superior to the straight phenolics for molding compounds. These characteristics can be varied to meet special requirements of any branch of the trade by proper selection of suitable grades of phenols, cresols or xylenols, and by varying the time and intensity of heating and other steps of the process as will subsequently be explained.

One of the most remarkable characteristics of the heat-treated dicyandiamide-phenol resins is the fact that they can be converted from the fusible to the infusible stage with very small quantities of an acidic curing agent. The straight phenolic two-stage resins are cured on the alkaline side preferably with from 8–10% of hexamethylene tetramine which is not only expensive but which changes the color of the cured phenolic resins to a decided yellow. The heat-treated dicyandiamide-phenol resins, on the other hand, can be cured in a much shorter time with the addition of only 0.5–1.5% of an acidic curing agent. Weak acids or their anhydrides may be used for this purpose to avoid corrosion of the molds. Although any weak acid may be used, we prefer the solid organic acids such as phthalic acid, phthalic anhydride, oxalic acid, benzoic acid, cinnamic acid, alpha hydroxy isobutyric acid and the like, as these are easily incorporated with the resin by dry mixing. Acid salts or materials which turn acid at molding temperatures may also be used.

Molding properties (a) Time of cure. The heat-treated dicyandiamide-phenol resins when mixed with small amounts of acid curing agents can be cured much more rapidly than the straight phenolics. A test tray 4 inches in diameter and .08 inch thick in cross-section can be cured in one minute, whereas four minutes curing time is required when the same tray is molded from a commercial phenol-formaldehyde molding compound. This is a most important advantage of the invention, as it quadruples the speed of production of such molded articles and decreases the mold investment accordingly.

(b) Flow characteristics. Molding compounds prepared from heat-treated dicyandiamide-phenol resins and acid curing agents can easily be modified to produce hard and soft flows as conditions require. We have found that the replacement of a part or all of the phenol by phenol homologs such as cresols, xylenols or mixtures thereof will improve the flow or "draw" of the compositions in the mold, thus facilitating the molding of objects combining a large surface area with thin cross-section. It is a remarkable fact that heat-treated dicyandiamide-phenol resins prepared almost exclusively from cresols or cresylic acid containing substantial quantities of xylenols will cure with acid curing agents in as short a time as will the corresponding resins prepared from high grade phenol, but with an even better flow in the mold.

(c) Color. The natural color of the heat-treated dicyandiamide-phenol resins is much lighter than that of the straight phenolics. Moreover, this color is not yellowed or darkened by the acid curing agent with which they are molded, so that the color of the resin in the final molded product is as light and permanent in color as is the resin in the original molding powder. This is an important advantage over the straight phenolic molding compounds, which are badly discolored during the molding operation.

(d) General molding characteristics. The heat-treated dicyandiamide-phenol resins are relatively insensitive to time and temperature variations and can be molded by the standard methods now in use. It is unnecessary to "breathe" the mold, and these resins have no tendency to foul the mold by sticking.

Characteristics of the molded products

The greatest advantage of articles molded from the molding compounds of the present invention lies in the wide range of desirable properties which they possess. Many of these properties, such as mechanical strength, water resistance, heat resistance, dielectric strength, color stability and a high degree of finish in the molded articles are inherent in the entire class of molding compounds included in the invention. Other properties, such as light colors, extremely high arc resistance, lack of taste and odor and soft flow in the mold are easily obtainable to a high degree by selection of the proper type of phenol, control of the time of refluxing, selection and adjustment of the kind and amount of aldehyde and other manufacturing steps.

(a) Color. The color of the molded article is dependent to a considerable extent on the raw materials used, although it is an advantage of the invention that clean colors are always obtained. When high grades of phenol are used in preparing the heat-treated dicyandiamide-phenol resin, and when light colored fillers such as alpha-pulp are used, a nearly white molding compound is obtained. This compound may be molded to products of the same light color, or it may be mixed with dyes and molded into articles having clear and brilliant colors.

When lower grades of phenols, such as 82% phenol or the commonly used grades of mixed cresols, are refluxed with dicyandiamide, and the resulting material condensed with an aldehyde, a resin is obtained which, while slightly darker than those prepared from pure phenol, is very much lighter in color than the corresponding straight phenolic resin prepared from the same phenols. This resin is especially well suited for the preparation of a general purpose molding compound, for it can be mixed with a filler and an acid curing agent and molded at 150–165° C. into a relatively light colored article. Molding compounds prepared from it are well suited for the production of a line of colors which are much lighter and cleaner and more attractive than those prepared from the corresponding straight phenolics.

(b) Color stability. This property is inherent in all the molding compounds of the present invention, and constitutes an outstanding advantage over the straight phenolic molding compounds which are darkened rapidly by ammonia or by exposure to light. Molded articles prepared from the heat-treated dicyandiamide-phenol resins have been exposed to strong ultra-violet light for more than 48 hours without appreciable discoloration.

(c) Water resistance. Molded articles of the present invention are completely resistant to water or water vapor. They will not crack or swell upon exposure to moisture-saturated air for long periods of time. They do not crack upon immersion in boiling water and absorb less than 1% of water when totally immersed at room temperature for 48 hours.

(d) Electrical properties. The dielectric strength of insulators made from resins in accordance with the present invention and using wood flour as a filler is of the order of 200–215 volts per mil. measured in oil at 100° C. by the A. S. T. M. step by step method, as compared with 80 volts per mil. for insulators of the straight phenolic type. Their arc resistance as defined by a standard method is from 40–60 seconds as compared with from 3–5 seconds for the straight phenolics.

(e) Taste and color. The molded products from heat-treated dicyandiamide-phenol resins impart no taste or odor to foodstuffs, cosmetics, etc. in contact therewith. They are therefore well suited for the production of molded jars and bottle caps, food containers, tableware and the like. Milk has been maintained in contact with such containers at 160° F. for prolonged periods of time without developing the slightest phenolic odor or flavor, and pear juice has been stored in them in a refrigerator from four to five days without impairing its taste.

Preparation

The process of preparing molding compositions having the improved properties that have been described is preferably carried out as follows: The phenol, cresol or phenolic mixture of the type best suited to give the desired properties in the finished composition is placed in a jacketed kettle provided with an agitator and dicyandiamide is added. The charge is heated with stirring to the reflux temperature of the phenol, which is about 181–212° C. and maintained at these temperatures with agitation for about 2.5–5.5 hours. During this time ammonia is given off and is allowed to escape.

The time of heating influences the properties of the finished product. We have found that upon continued heating as much as 0.2 mole of ammonia can be driven off for each mole of dicyandiamide charged, but in most cases a shorter heating period and correspondingly reduced ammonia evolution is recommended. Ordinarily the best results are obtained when from 0.13 to 0.18 mole of ammonia per mole of dicyandiamide is liberated, but we have obtained resins of good properties with much shorter heating periods and with the evolution of as little as 0.07–0.10 mole of ammonia per mole of dicyandiamide.

In the preparation of very light colored molding compounds, it is frequently desirable to carry out the refluxing in an atmosphere of an inert gas such as nitrogen or carbon dioxide in order to exclude oxygen. To retain color stability in the molded products substantially all of the free ammonia should be removed after refluxing, and this can be accomplished by continuing the flow of inert gas or by continued agitation of the charge at temperatures lower than those necessary to evolve ammonia from the dicyandiamide.

The amounts of dicyandiamide to be heated with the phenol may vary between rather wide limits, depending on the characteristics desired in the finished product. Ordinarily equimolecular ratios of phenol and dicyandiamide are used, but where better finish and heat resistance are desired it may be advisable to employ 2 or 3 moles of dicyandiamide for each mole of phenol.

After cooling the heat-treated material to below 100° C., and after substantially all the free ammonia has been removed, formaldehyde, acetaldehyde or other aldehyde is added. Preferably a commercial 37.5% formaldehyde solution is used in amounts of 1.5–5 moles of formaldehyde for each mole of heat-treated material. The condensation may be started under slightly acid, neutral or alkaline conditions, but the best results are obtained when the formaldehyde is first adjusted to a pH of 7.5–10 and preferably to 9.1–9.5 as this avoids gelation of the resin. After the aldehyde is added the charge is heated to refluxing temperatures, which are about 96–98° C., and refluxed for 0.25–2 hours depending on the purpose for which the resin is to be used. For most molding compositions a refluxing time of 1–1.5 hours is preferred, while for the preparation of laminating syrups the shorter refluxing periods are preferable. During the refluxing it will be found that the pH of the material drops to about 7.2–7.6. Care should be taken to avoid a pH of less than 7.0 in the kettle, as in this case there will be serious danger of gelation during the subsequent dehydration.

After refluxing the charge for the desired period of time it is dehydrated. This step is preferably carried out by applying a vacuum to the kettle such that most of the water can be removed at 72–76° C. Near the end point of the dehydration the temperature will rise to about 95–110° C., depending on the type of resin and time of reflux, and the charge is poured at this temperature after the last of the water has been evolved. It cools to a hard, brittle mass which will be clear if nitrogen was used as the inert gas in the kettle but slightly cloudy if carbon dioxide was used.

To prepare the molding compound, the resin is preferably finely ground (150–300 mesh). It is then thoroughly blended with a lubricant such as calcium stearate, zinc oleate or the like and with an acid curing agent such as phthalic acid or anhydride, benzoic acid, succinic acid, oxalic acid or other solid organic acids. A filler such as wood flour, alpha-pulp, asbestos, diatomaceous earth, mica or similar material and a suitable amount of dyestuff are then added and the mixture is again blended. The material is compounded on differential rolls at 100–110° C. for 0.75–2.5 minutes when using a wood flour filler and 1.5–4.5 minutes with alpha-pulp filler and the resulting sheets are then ground to a particle size suitable for molding which may be done with or without a preliminary pelleting.

An alternative process which may be employed in the preparation of impregnated sheets or in preparing molding compounds is to omit the vacuum dehydration leaving the resin in syrup form. This syrup may be soaked into absorbent paper sheets which are then dried and pressed out in a flat mold to make a laminated board. Similarly, the resin syrup may be poured directly onto a blended mixture of the filler, acid curing agent, lubricant and dye in a Banbury mixer at temperatures of 60–90° C. and mixed until the filler is thoroughly coated. The mass may then be dried with or without vacuum under controlled conditions until substantially all the water is removed after which it may be ground if desired.

The invention will be illustrated in greater detail by the following specific examples. It should be understood, however, that these examples are given primarily for purposes of illustration, and that the invention in its broader aspects is not limited thereto. In the examples the following terminology will be used:

(1) Synthetic phenol. This is the C. P. material and consists of practically 100% $C_6H_5OH$.

(2) 39.5° phenol. This is the highest grade of coal tar phenol obtainable. It contains between 99 and 99.5% $C_6H_5OH$.

(3) 82% phenol. This material consists of 82% $C_6H_5OH$, 8–14% meta and para-cresols and 4–10% o-cresol.

(4) "Barrett No. 8 cresol."—A representative sample of this material contains 0.25% o-cresol, 2.25% phenol, 73.5% of a mixture containing 60% meta and 40% para cresol and 13.5% of a fraction boiling between 204° C. and 210° C. Half of this fraction is meta and para cresols and the other half is known as the "X—1" fraction which consists of 20% meta and para cresols, 60% 1.2.4 xylenol and 20% 1.3.5 xylenol.

(5) "Barrett cresylic acid (212° C.)."—A representative sample of this material contains 10.8% phenol, 1.2% o-cresol, 20% meta and para-cresols, 20% "X—1" fraction, 20% 1.2.4 xylenol, 20% 1.3.5 xylenol and 8% of a higher fraction boiling between 230–250° C.

*Example 1*

23.6 parts by weight of dicyandiamide and 26.4 parts of 82% phenol are heated and refluxed at atmospheric pressure with continuous agitation for 4 hours. If color is important the refluxing is preferably carried out in an atmosphere free from oxygen, and a stream of nitrogen gas or carbon dioxide is preferably passed through the mixture during the entire reflux period. Shortly after the heating is begun an evolution of ammonia is noted, and the refluxing is continued until about 0.15 mole of ammonia has been given off for each mole of dicyandiamide charged. The agitation and treatment with inert gas is then preferably continued to sweep out the last traces of ammonia, after which the mixture is cooled to below 100° C.

60.8 parts of 37.5% formaldehyde solution are neutralized by the addition of sodium hydroxide solution to a pH of 9.1. This solution is then added to the cooled reaction mixture and the formaldehyde condensation is carried out with refluxing at 96–98° C. for about 0.5–2 hours. The condensation product is dehydrated by heating under a 21 inch vacuum until all the water is removed and the resin, upon cooling, is hard and brittle. The resin is then cooled to room temperatures and ground to 150–300 mesh.

A molding compound is prepared by intimately mixing 400 parts of the resin, 400 parts of wood flour, 2 parts of phthalic acid and 4 parts of calcium stearate with suitable amounts of dyestuff to give the required color. The mixture is blended thoroughly and then compounded on steam-heated differential rolls at 100–110° C. for 0.75 to 2.5 minutes, depending on the flow desired. The material may then be ground to suitable particle size and pelleted if desired.

*Example 2*

13.6 parts of "Barrett No. 8 Cresol" and 13.6 parts of 82% phenol are mixed with 22.7 parts of dicyandiamide and the mixture is heated and refluxed with agitation as in Example 1 until about 0.17 mole of ammonia have been driven off for each mole of dicyandiamide charged. The agitation is continued to sweep out the last traces of ammonia and the mixture is then cooled to below 100° C.

60.8 parts of 37.5% formaldehyde solution are neutralized with sodium hydroxide solution to a pH of 9.1 and added to the heat-treated dicyandiamide-phenol-cresol mixture. The formaldehyde condensation is then carried out by refluxing the mixture at 96–98° C. for 1–1.5 hours. The resin is dehydrated under a vacuum, poured, cooled to room temperatures and ground to 150–300 mesh.

400 parts of the ground resin are intimately mixed and blended with 400 parts of wood flour, 2 parts of oxalic acid and 4 parts of calcium stearate. The resulting mixture is an excellent general purpose molding compound; it is light in color and will produce molded pieces of excellent heat resistance, water resistance and electrical properties.

*Example 3*

31.6 parts by weight of "Barrett No. 8 Cresol" and 23.6 parts of dicyandiamide are heat-treated as in Example 1. The resulting mixture is condensed with 60.8 parts of 37.5% formaldehyde solution having a pH of 9.1, dehydrated under a vacuum, cooled and ground. 400 parts of the resulting resin are mixed with 1.5 parts of phthalic acid, 400 parts of wood flour, or suitable amounts of diatomaceous earth or other filler together with a lubricant. The resulting molding compound is well suited for a large variety of purposes, since it can be molded to pieces which are fairly light in color and possess good dielectric strength, excellent arc resistance and retain their dimensions under the most extreme conditions of humidity.

*Example 4*

27 parts of "Barrett Cresylic Acid (212° C.)" and 18.5 parts of dicyandiamide are heat-treated as in Example 1 until about 0.13 mole of ammonia are evolved for each mole of dicyandiamide. The product is condensed with 46 parts of 37.5% formaldehyde solution having a pH of 9.1 for 1–1.5 hours after which the resulting resin is dehydrated under a vacuum, cooled and ground to 150–300 mesh or finer.

400 parts of the ground resin are mixed with an equal weight of wood flour or suitable amounts of other fillers such as mica, diatomaceous earth, cotton flock, etc., together with 2 parts of an acid curing agent such as phthalic acid and a lubricant such as calcium stearate. The resulting powder can be cured in 1–2 minutes under ordinary molding conditions and is therefore a good general purpose molding compound for producing any type of molded article in which the lightest color is not required. It is particularly valuable for its good electrical properties and moisture resistance.

*Example 5*

26.4 parts of synthetic phenol and 23.6 parts of recrystallized dicyandiamide are heated and refluxed until about 0.14 mole of ammonia are evolved for each mole of dicyandiamide. The refluxing is preferably carried out with continuous agitation and carbon dioxide is passed in during the entire refluxing period to maintain an oxygen-free atmosphere over the batch. When the requisite amount of ammonia has been given off the temperature is lowered and the agitation and treatment with inert gases are continued until the last traces of ammonia have been driven out of the batch.

67.5 parts of 37.5% formaldehyde solution having a pH of 9.1 are then added and the mixture is refluxed for 1–1.5 hours with agitation. A vacuum of 21–22 inches is then applied to the kettle and the material is dehydrated after which it is cooled and ground to 150–300 mesh.

200 parts of the ground resin are mixed with 108 parts of alpha-pulp, 1.5 parts of phthalic acid and 1.5 parts of calcium stearate. The mixture is blended thoroughly and compounded on steam heated differential rolls for 3 minutes at 105° C. and again ground.

The resulting powder is a very light colored molding compound which can be used for any purpose where the highest type of molded product is desired. It can be cured under ordinary molding conditions in from 1 to 2 minutes into molded pieces having excellent light resistance. When dyes are incorporated with the molding compound, molded pieces having bright colors and excellent color stability are obtained which do not darken upon exposure to light for long periods of time.

What we claim is:

1. A molding composition comprising a filler, an acid curing agent, and the condensation product of an aldehyde with the material obtained upon heating dicyandiamide and a phenol until from 0.07 to 0.2 mole of ammonia per mole of dicyandiamide are evolved.

2. A molding composition comprising a filler, an acid curing agent, and the condensation product of formaldehyde with the material obtained upon heating dicyandiamide and a phenol until from 0.07 to 0.2 mole of ammonia per mole of dicyandiamide are evolved.

3. A molding composition comprising a filler, a solid organic acid curing agent, and the condensation product of an aldehyde with the material obtained upon heating dicyandiamide and a phenol until from 0.07 to 0.2 mole of ammonia per mole of dicyandiamide are evolved.

4. A molding composition comprising a filler, an acid curing agent, and the condensation product of an aldehyde with the material obtained upon heating dicyandiamide and an alkyl phenol until from 0.07 to 0.2 mole of ammonia per mole of dicyandiamide are evolved.

5. A molding composition comprising a filler, an acid curing agent, and the condensation product of an aldehyde with the material obtained upon heating dicyandiamide and a cresol until from 0.07 to 0.2 mole of ammonia per mole of dicyandiamide are evolved.

6. A molding composition comprising a filler, an acid curing agent, and the condensation product of an aldehyde with the material obtained upon heating dicyandiamide and a xylenol until from 0.07 to 0.2 mole of ammonia per mole of dicyandiamide are evolved.

7. A molding composition comprising a filler, an acid curing agent, and a condensation product of formaldehyde with the material obtained upon heating dicyandiamide and cresylic acid until from 0.07 to 0.2 mole of ammonia per mole of dicyandiamide are evolved.

FRANK J. GROTEN.
JAMES H. LOWER.